US010913820B2

(12) United States Patent
Hwang et al.

(10) Patent No.: US 10,913,820 B2
(45) Date of Patent: Feb. 9, 2021

(54) PROCESS FOR PRODUCING A CATIONIC DYEABLE POLYESTER AND THE CATIONIC DYEABLE POLYESTER PRODUCED THEREBY

(71) Applicant: Far Eastern New Century Corporation, Taipei (TW)

(72) Inventors: Der-Ren Hwang, Taipei (TW); Cheng-Ting Wang, Taipei (TW); Yen-Hsien Li, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 91 days.

(21) Appl. No.: 16/249,490

(22) Filed: Jan. 16, 2019

(65) Prior Publication Data

US 2020/0031992 A1     Jan. 30, 2020

(30) Foreign Application Priority Data

Jul. 30, 2018    (TW) .............................. 107126282 A

(51) Int. Cl.
| | | |
|---|---|---|
| *C08G 63/68* | (2006.01) | |
| *C08G 63/688* | (2006.01) | |
| *D06P 3/34* | (2006.01) | |
| *D06P 3/52* | (2006.01) | |
| *C08G 63/86* | (2006.01) | |

(52) U.S. Cl.
CPC ....... *C08G 63/6886* (2013.01); *C08G 63/866* (2013.01); *D06P 3/342* (2013.01); *D06P 3/52* (2013.01)

(58) Field of Classification Search
CPC ....................................................... C08G 63/68
USPC ......................................................... 528/285
See application file for complete search history.

(56) References Cited

U.S. PATENT DOCUMENTS 3,052,711 A *   9/1962   Weir ...................... C07C 67/26
                                                                      560/93

\* cited by examiner

*Primary Examiner* — Duc Truong
(74) *Attorney, Agent, or Firm* — TraskBritt

(57) ABSTRACT

A process for producing a cationic dyeable polyester includes the steps of:
(a) subjecting a combination of a bis-hydroxy alkyl terephthalate monomer of Formula (1) defined herein and an organic diacid monomer mixture which includes an aromatic dicarboxylic acid monomer and a sulfo group-containing aromatic dicarboxylic acid dyeable monomer to an esterification reaction to form an esterification reaction product; and
(b) subjecting the esterification reaction product to a polycondensation reaction.

10 Claims, No Drawings

PROCESS FOR PRODUCING A CATIONIC DYEABLE POLYESTER AND THE CATIONIC DYEABLE POLYESTER PRODUCED THEREBY

CROSS-REFERENCE TO RELATED APPLICATION

This application claims priority of Taiwanese Application No. 107126282, filed on Jul. 30, 2018.

FIELD

The disclosure relates to a process for producing a polyester, and more particularly to a process for producing a cationic dyeable polyester. The disclosure also relates to the cationic dyeable polyester produced by the process.

BACKGROUND

A conventional way to provide fibers with a relatively bright color is to dye the fibers using a cationic dye. However, polyester fibers of polyethylene terephthalate can merely be dyed using a disperse dye or an azo dye due to its own chemical characteristics, and cannot be dyed using the cationic dye. For enabling the polyester fibers to be dyed using the cationic dye so as to provide the polyester fibers with a bright color, a modified copolymerization reaction is conventionally implemented by adding a sulfo group-containing aromatic dicarboxylic acid as a dyeable monomer during the process for producing the polyester, so as to produce a sulfo group-containing cationic dyeable polyester for subsequent dyeing thereof. However, the cationic dyeable polyester produced by the aforesaid process can merely be dyed at an elevated temperature under an elevated pressure. If the cationic dyeable polyester is desired to be dyed at a normal pressure, addition of a significant amount of the sulfo group-containing aromatic dicarboxylic acid is necessary for implementing the modified copolymerization reaction during the process for producing the cationic dyeable polyester. However, in a molten state, a significant amount of sulfo groups contained in the sulfo group-containing aromatic dicarboxylic acid may aggregate, resulting in a physical cross-linking among the ionic sulfo groups. Therefore, melt viscosity of the reaction mixture during a polycondensation reaction may be too high, causing insufficient stirring of the reaction mixture using a stirrer installed in a reactor, such that the polycondensation reaction for producing the cationic dyeable polyester cannot be implemented effectively. Consequently, the polymerization degree of the cationic dyeable polyester cannot be enhanced, leading to a problem of inferior mechanical strength of the thus produced cationic dyeable polyester.

SUMMARY

Therefore, an object of the disclosure is to provide a process for producing a cationic dyeable polyester to overcome the aforesaid shortcomings of the prior art, i.e., to reduce aggregation of the ionic sulfo groups contained in the sulfo group-containing aromatic dicarboxylic acid and thus to alleviate the physical cross-linking among the ionic sulfo groups.

Another object of the disclosure is to provide a cationic dyeable polyester having a relatively high polymerization degree.

According to a first aspect of the disclosure, there is provided a process for producing a cationic dyeable polyester, comprising the steps of:

(a) subjecting a combination of a bis-hydroxy alkyl terephthalate monomer of Formula (1) and an organic diacid monomer mixture which includes an aromatic dicarboxylic acid monomer and a sulfo group-containing aromatic dicarboxylic acid dyeable monomer to an esterification reaction to form an esterification reaction product,

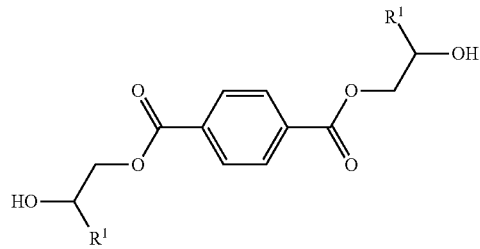

(Formula 1)

wherein each $R^1$ independently represents hydrogen, phenyl, a $C_1$-$C_6$ linear alkyl group, or a $C_3$-$C_6$ branched alkyl group; and (b) subjecting the esterification reaction product to a polycondensation reaction.

According to a second aspect of the disclosure, there is provided a cationic dyeable polyester produced by the process for producing a cationic dyeable polyester according to the first aspect of the disclosure.

DETAILED DESCRIPTION

A process for producing a cationic dyeable polyester, comprising the steps of:

(a) subjecting a combination of a bis-hydroxy alkyl terephthalate monomer of Formula (1) and an organic diacid monomer mixture which includes an aromatic dicarboxylic acid monomer and a sulfo group-containing aromatic dicarboxylic acid dyeable monomer to an esterification reaction to form an esterification reaction product,

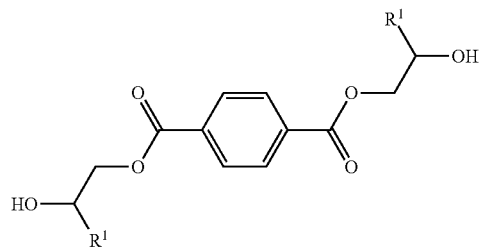

(Formula 1)

wherein each $R^1$ independently represents hydrogen, phenyl, a $C_1$-$C_6$ linear alkyl group, or a $C_3$-$C_6$ branched alkyl group; and (b) subjecting the esterification reaction product to a polycondensation reaction.

In certain embodiments, each $R^1$ in Formula 1 represents hydrogen.

A non-limiting example of the bis-hydroxy alkyl terephthalate monomer of Formula (1) is bis(2-hydroxyethyl)

terephthalate, which may be a commercially available reagent-grade chemical, or which may be obtained by an alcoholysis reaction of polyethylene terephthalate with ethylene glycol or by a reaction of terephthalic acid with ethylene oxide. It should be noted that the bis-hydroxy alkyl terephthalate monomer used in the disclosure is a pure material, rather than a mixture of the bis-hydroxy alkyl terephthalate monomer and oligomer thereof. For example, the bis-hydroxy alkyl terephthalate monomer used in the disclosure is a compound of

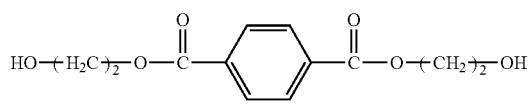

(i.e., bis(2-hydroxyethyl) terephthalate), rather than a mixture of bis(2-hydroxyethyl) terephthalate and oligomer thereof obtained via an esterification reaction of terephthalic acid with ethylene glycol or via a transesterification of dimethyl terephthalate with ethylene glycol.

The sulfo group of the sulfo group-containing aromatic dicarboxylic acid dyeable monomer may be in the form of an alkali metal salt or an alkali earth metal salt of a sulfonic acid, but is not limited thereto.

In certain embodiments, the sulfo group-containing aromatic dicarboxylic acid dyeable monomer is selected from the group consisting of 2-sulfoterephthalic acid monosodium salt, 5-sulfoisophthalic acid monosodium salt, and a combination thereof.

In certain embodiments, a molar ratio of the bis-hydroxy alkyl terephthalate monomer to the sulfo group-containing aromatic dicarboxylic acid dyeable monomer is in a range from 1.3:1 to 100:1. When the molar ratio of the bis-hydroxy alkyl terephthalate monomer to the sulfo group-containing aromatic dicarboxylic acid dyeable monomer is within the range, the cationic dyeable polyester thus produced may have superior dyeability. In certain embodiments, the molar ratio of the bis-hydroxy alkyl terephthalate monomer to the sulfo group-containing aromatic dicarboxylic acid dyeable monomer is in a range from 30:1 to 55:1.

In certain embodiments, the aromatic dicarboxylic acid monomer is selected from the group consisting of terephthalic acid, isophthalic acid, phthalic acid, diphenic acid, 2,6-naphthalic acid, 1,5-naphthalic acid, and combinations thereof. In certain embodiments, the aromatic dicarboxylic acid monomer is terephthalic acid.

In certain embodiments, a molar ratio of the bis-hydroxy alkyl terephthalate monomer to the aromatic dicarboxylic acid monomer is in a range from 1.5:1 to 150:1. When the molar ratio of the bis-hydroxy alkyl terephthalate monomer to the aromatic dicarboxylic acid monomer is within the range, the cationic dyeable polyester may be produced more favorably. In certain embodiments, the molar ratio of the bis-hydroxy alkyl terephthalate monomer to the aromatic dicarboxylic acid monomer is in a range from 1.7:1 to 50:1.

There is no specific limitation to the temperature of the esterification reaction as long as the esterification reaction can be implemented. In certain embodiments, the esterification reaction is implemented at a temperature of from 190° C. to 260° C.

Likewise, there is no specific limitation to the pressure of the esterification reaction as long as the esterification reaction can be implemented. In certain embodiments, the esterification reaction is implemented at a normal pressure. It should be noted that, as compared to the esterification reaction of ethylene glycol with the aromatic dicarboxylic acid monomer implemented at an elevated pressure, the esterification reaction in step (a) of the process for producing a cationic dyeable polyester according to the disclosure may be implemented at a normal pressure with satisfactory reactivity due to use of the combination of the bis-hydroxy alkyl terephthalate monomer of Formula (1) and the organic diacid monomer mixture.

There is no specific limitation to the conditions of the polycondensation reaction as long as the polycondensation reaction can be implemented. In certain embodiments, in order to further enhance the polycondensation reaction, the polycondensation reaction in step (b) of the process for producing a cationic dyeable polyester according to the disclosure is implemented in the presence of a transition metal-containing polycondensation catalyst. Examples of the transition metal-containing polycondensation catalyst include antimony-containing compounds, tin-containing compounds, titanium-containing compounds, gallium-containing compound, and aluminum-containing compounds, but are not limited thereto. The examples of the transition metal-containing polycondensation catalyst may be used alone or in admixture of two or more thereof. In certain exemplary embodiments, the transition metal-containing polycondensation catalyst is selected from the group consisting of antimony (III) oxide, antimony acetate, antimony glycolate, titanium isopropoxide, titanium butoxide, dibutyltin oxide, isobutyl hydroxytin oxide, and combinations thereof. There is no specific limitation to the amount of the transition metal-containing polycondensation catalyst, which may be adjusted according to practical requirements, for example, according to the extent of the polycondensation reaction. The transition metal-containing polycondensation catalyst of the polycondensation reaction may be added, for example, at a time point when an esterification rate of the esterification reaction is at least 80%.

Likewise, there is no specific limitation to the temperature and the pressure of the polycondensation reaction as long as the polycondensation reaction can be implemented. In certain embodiments, the polycondensation reaction is implemented at a temperature of from 270° C. to 285° C.

In certain embodiments, a polycondensation stabilizer may be optionally added during the implementation of the polycondensation reaction. A non-limiting example of the polycondensation stabilizer is phosphoric acid.

A cationic dyeable polyester produced by the aforesaid process of the disclosure has an average aggregate radius of up to 2.3 nm. The term "average aggregate radius" may be interpreted according to the following explanation.

It is generally known in current research that ion pairs contained in ionomers may aggregate via interaction therebetween to form multiplets. The cross-linking of the multiplets may restrict mobility of the polymer chains surrounding and connecting the multiplets. In addition, the mobility of the polymer chains increases gradually with increased distance of the polymer chains from the multiplets. Therefore, each multiplet is surrounded by a region of the polymer chains having restricted chain mobility.

The average aggregate radius of the cationic dyeable polyester produced by the aforesaid process of the disclosure may be interpreted according to a theory similar to the aforesaid explanation. Specifically, the sulfo groups contained in the cationic dyeable polyester may aggregate to form multiplets. Mobility of the polyester chains surrounding the multiplets may be reduced due to the restricted mobility of the polyester chains caused by the multiplets. Each of the multiplets formed by the sulfo groups is surrounded by a region of the polyester chains having restricted chain mobility. The average aggregate radius is defined by a radius of a region constituted by the polyester chains having restricted chain mobility and one of the multiplets that is surrounded by the polyester chains. The average aggregate radius of the cationic dyeable polyester can be determined based on data analysis obtained using a small-angle X-ray scattering (SAXS) instrument. Specifically, the data obtained by the SAXS device is fitted to determine the region formed by the multiplet that is surrounded by the polyester chains and the region formed by the polyester chains having restricted chain mobility. The average aggregate radius of the cationic dyeable polyester can be thereby calculated.

Examples of the disclosure will be described hereinafter. It is to be understood that these examples are exemplary and explanatory and should not be construed as a limitation to the disclosure.

Example 1

Bis(2-hydroxyethyl) terephthalate powders (Sigma-Aldrich Corp., 284 g, 1.12 moles), terephthalic acid (108 g, 0.65 mole), and 2-sulfoterephthalic acid monosodium salt (9.2 g, 0.034 mole) were added into a reaction vessel (1 L) to obtain a mixture in which a molar ratio of bis(2-hydroxyethyl) terephthalate to terephthalic acid was 1.72:1, and a molar ratio of bis(2-hydroxyethyl) terephthalate to 2-sulfoterephthalic acid monosodium salt was 32.9:1. Nitrogen gas was then introduced into the reaction vessel until the pressure in the reaction vessel reached 0.5-1 kg/cm$_2$ so as to displace air in the reaction vessel. The mixture in the reaction vessel was subjected to an esterification reaction under a nitrogen atmosphere at a normal pressure and at 260° C. until an esterification rate was 84% to obtain an esterification reaction product.

Antimony (III) oxide (0.105 g) and a solution of phosphoric acid in ethylene glycol (0.525 g, concentration of phosphoric acid: 5 wt %) were then added into the reaction vessel, followed by a polycondensation reaction of the esterification reaction product at 275° C. with stirring by a stirrer (a spiral anchor manufactured by Lucky Seven Industrial Co. Ltd., fixing frequency: 25 Hz) until a torque of the stirrer reached 100 W so as to obtain a cationic dyeable polyester.

The amount of 2-sulfoterephthalic acid monosodium salt used as the sulfo group-containing aromatic dicarboxylic acid dyeable monomer was 2.6 wt % based on a total weight of the cationic dyeable polyester.

Example 2

The procedure of Example 2 was similar to that of Example 1, except that the amount of 2-sulfoterephthalic acid monosodium salt used in this example was 5.6 g (0.021 mole) (i.e., the molar ratio of bis(2-hydroxyethyl) terephthalate to 2-sulfoterephthalic acid monosodium salt was 53.3:1).

The amount of 2-sulfoterephthalic acid monosodium salt used as the sulfo group-containing aromatic dicarboxylic acid dyeable monomer was 1.6 wt % based on a total weight of the cationic dyeable polyester.

Example 3

The procedure of Example 3 was similar to that of Example 1, except that 2-sulfoterephthalic acid monosodium salt used in Example 1 was replaced with 5-sulfoisophthalic acid monosodium salt (9.2 g, 0.034 mole) (i.e., a molar ratio of bis(2-hydroxyethyl) terephthalate to 5-sulfoisophthalic acid monosodium salt was 32.9:1).

The amount of 5-sulfoisophthalic acid monosodium salt used as the sulfo group-containing aromatic dicarboxylic acid dyeable monomer was 2.6 wt % based on a total weight of the cationic dyeable polyester.

The amount of the sulfo group-containing aromatic dicarboxylic acid dyeable monomer of each of Examples 1 to 3 was calculated as follows:

$$\{W_1/[W_2\times(M_1/M_2)+W_3\times(M_1/M_3)+W_1]\}\times 100\%$$

wherein $W_1$: Weight of the sulfo group-containing aromatic dicarboxylic acid dyeable monomer;
$W_2$: Weight of bis(2-hydroxyethyl) terephthalate;
$W_3$: Weight of terephthalic acid;
$M_1$: Molecular weight of the repeating unit of the cationic dyeable polyester;
$M_2$: Molecular weight of bis(2-hydroxyethyl) terephthalate; and
$M_3$: Molecular weight of terephthalic acid.

Therefore, the amount of the sulfo group-containing aromatic dicarboxylic acid dyeable monomer of each of Examples 1 and 3 was calculated as follows:

$$\{9.2/[284\times(192/254)+108\times(192/166)+9.2]\}\times 100\%=2.6 \text{ wt \%}.$$

The amount of the sulfo group-containing aromatic dicarboxylic acid dyeable monomer of Example 2 was calculated as follows:

$$\{5.6/[284\times(192/254)+108\times(192/166)+5.6]\}\times 100\%=1.6 \text{ wt \%}.$$

Comparative Example 1

Ethylene glycol (141 g, 2.27 moles), terephthalic acid (303 g, 1.825 moles), and 2-sulfoterephthalic acid monosodium salt (9.2 g, 0.034 mole) were added into a reaction vessel (1 L) to obtain a mixture. The mixture in the reaction vessel was subjected to an esterification reaction under a nitrogen atmosphere of 2 kg/cm$^2$ and at 260° C. until an esterification rate was 86% to obtain an esterification reaction product.

Antimony (III) oxide (0.105 g) and a solution of phosphoric acid in ethylene glycol (0.525 g, concentration of phosphoric acid: 5 wt %) were then added into the reaction vessel, followed by a polycondensation reaction of the esterification reaction product at 275° C. with stirring by a stirrer (a spiral anchor manufactured by Lucky Seven Industrial Co. Ltd., fixing frequency: 25 Hz) until a torque of the stirrer reached 100 W so as to obtain a cationic dyeable polyester.

The amount of 2-sulfoterephthalic acid monosodium salt used as the sulfo group-containing aromatic dicarboxylic acid dyeable monomer was 2.6 wt % based on a total weight of the cationic dyeable polyester.

Comparative Example 2

The procedure of Comparative Example 2 was similar to that of Comparative Example 1, except that the amount of 2-sulfoterephthalic acid monosodium salt used in this comparative example was 5.6 g (0.021 mole).

The amount of 2-sulfoterephthalic acid monosodium salt used as the sulfo group-containing aromatic dicarboxylic acid dyeable monomer was 1.6 wt % based on a total weight of the cationic dyeable polyester.

Comparative Example 3

Ethylene glycol (141 g, 2.27 moles) and terephthalic acid (303 g, 1.825 moles) were added into a reaction vessel (1 L) to obtain a first mixture. The first mixture in the reaction vessel was subjected to an initial esterification reaction under a nitrogen atmosphere of 2 kg/cm² and at 260° C. until an esterification rate of the initial esterification reaction was 86%. 2-sulfoterephthalic acid monosodium salt (9.2 g, 0.034 mole) was then added into the reaction vessel to obtain a second mixture. The second mixture in the reaction vessel was subjected to a further esterification reaction at a normal atmosphere and at 260° C. until an esterification rate of the further esterification reaction was 85% to obtain an esterification reaction product.

Antimony (III) oxide (0.105 g) and a solution of phosphoric acid in ethylene glycol (0.525 g, concentration of phosphoric acid: 5 wt %) were then added into the reaction vessel, followed by a polycondensation reaction of the esterification reaction product at 275° C. with stirring by a stirrer (a spiral anchor manufactured by Lucky Seven Industrial Co. Ltd., fixing frequency: 25 Hz) until a torque of the stirrer reached 100 W so as to obtain a cationic dyeable polyester.

The amount of 2-sulfoterephthalic acid monosodium salt used as the sulfo group-containing aromatic dicarboxylic acid dyeable monomer was 2.6 wt % based on a total weight of the cationic dyeable polyester.

Comparative Example 4

The procedure of Comparative Example 4 was similar to that of Comparative Example 3, except that the amount of 2-sulfoterephthalic acid monosodium salt used in this comparative example was 5.6 g (0.021 mole).

The amount of 2-sulfoterephthalic acid monosodium salt used as the sulfo group-containing aromatic dicarboxylic acid dyeable monomer was 1.6 wt % based on a total weight of the cationic dyeable polyester.

Comparative Example 5

The procedure of Comparative Example 5 was similar to that of Comparative Example 1, except that 2-sulfoterephthalic acid monosodium salt used in Comparative Example 1 was replaced with 5-sulfoisophthalic acid monosodium salt (9.2 g, 0.034 mole).

The amount of 5-sulfoisophthalic acid monosodium salt used as the sulfo group-containing aromatic dicarboxylic acid dyeable monomer was 2.6 wt % based on a total weight of the cationic dyeable polyester.

Comparative Example 6

The procedure of Comparative Example 6 was similar to that of Comparative Example 3, except that 2-sulfoterephthalic acid monosodium salt used n Comparative Example 3 was replaced with 5-sulfoisophthalic acid monosodium salt (9.2 g, 0.034 mole).

The amount of 5-sulfoisophthalic acid monosodium salt used as the sulfo group-containing aromatic dicarboxylic acid dyeable monomer was 2.6 wt % based on a total weight of the cationic dyeable polyester.

The amount of the sulfo group-containing aromatic dicarboxylic acid dyeable monomer of each of Comparative Examples 1 to 6 was calculated as follows:

$$\{W'_1/[W'_2 \times (M'_1/M'_2) + W'_1]\} \times 100\%$$

wherein
$W'_1$: Weight of the sulfo group-containing aromatic dicarboxylic acid dyeable monomer;
$W'_2$: Weight of terephthalic acid;
$M'_1$: Molecular weight of the repeating unit of the cationic dyeable polyester; and
$M'_2$: Molecular weight of terephthalic acid.

Therefore, the amount of the sulfo group-containing aromatic dicarboxylic acid dyeable monomer of each of Comparative Examples 1, 3, 5, and 6 was calculated as follows:

$$(9.2/[303 \times (192/166) + 9.2]) \times 100\% = 2.6 \text{ wt \%}.$$

The amount of the sulfo group-containing aromatic dicarboxylic acid dyeable monomer of each of Comparative Examples 2 and 4 was calculated as follows:

$$\{5.6/[303 \times (192/166) + 5.6]\} \times 100\% = 1.6 \text{ wt \%}.$$

Evaluation of Properties of the Cationic Dyeable Polyester:

1. Average Aggregate Radius:

The average aggregate radius of the cationic dyeable polyester was measured at a temperature of 270° C. and at a wavelength ranging from 0.3 nm to 225 nm using a BL23A small-angle X-ray scattering (SAXS) instrument of the National Synchrotron Radiation Research Center, Taiwan. The smaller the average aggregate radius of the cationic dyeable polyester, the lower the aggregation extent of the cationic dyeable polyester.

2. Intrinsic Viscosity (IV):

The cationic dyeable polyester was added with a mixture of phenol and tetrachloroethane in a weight ratio of 3:2 to prepare a test solution of 0.4 wt/vol %. The intrinsic viscosity of the test solution was measured using an Ubbelohde viscometer at a temperature of 30±0.2° C. The higher the intrinsic viscosity of the cationic dyeable polyester, the higher the polymerization degree of the cationic dyeable polyester.

3. Dyeability (Color Hue (L))

The cationic dyeable polyester was dyed using a dyeing composition including 1 wt % of a cationic dye (K. Blue GSLED), 2 g/L of a dyeing adjuvant (sodium sulfate), and 0.8 g/L of an acid agent (Model: Buffer CDP Lip; Manufacturer: Chung Fu Dyestuffs Co. Ltd.) in a liquor ratio of the cationic dyeable polyester to the dyeing composition of 1:3, and at a temperature of 120° C. for a dyeing period of 30 min. The color hue (L) of the cationic dyeable polyester after being dyed was measured using a color meter (Model: NE4000; Manufacturer: Nippon Denshoku Industries Co., Ltd.). As generally recognized in the art, the L value (i.e. whiteness) of not larger than 24 indicates that the cationic dyeable polyester has good dyeability.

4. Content of Diethylene Glycol:

A content of diethylene glycol (in wt %) in the cationic dyeable polyester was measured using a gas chromatograph (Manufacturer: Perkin Elmer; Model: Autosystem XL) according to a process as follows. The cationic dyeable polyester was added into 1,4-butylene glycol, followed by addition of a solution of potassium hydroxide in n-propanol to dissolve the cationic dyeable polyester and then addition of a proper amount of hydrogen chloride (1.6 N) with stirring to obtain a mixture. A supernatant obtained from the mixture was injected into the gas chromatograph to determine a concentration of diethylene glycol.

5. Decomposition Temperature (Td):

Decomposition temperature of the cationic dyeable polyester was measured using a thermogravimetric analyzer (Manufacturer: TA Instruments; Model: TGA 2950) in accordance with conditions of an increased heating temperature of 10° C. per minute from 30° C. to 600° C. under an oxygen atmosphere. The temperature at which there is a 5% weight loss in the cationic dyeable polyester was recorded as the decomposition temperature. It should be noted that the higher the decomposition temperature, the better the thermal stability of the cationic dyeable polyester.

The results of the properties of the cationic dyeable polyester obtained in each of Examples 1 to 3 and Comparative Examples 1 to 6 are shown in Tables 1 and 2 below.

TABLE 1

|  |  | Composition of cationic dyeable polyester | Molar ratio of bis-hydroxy alkyl terephthalate monomer to sulfo group-containing aromatic dicarboxylic acid dyeable monomer | Amount of sulfo group-containing aromatic dicarboxylic acid dyeable monomer (wt %) | IV (dl/g) | Average aggregate radius (nm) |
|---|---|---|---|---|---|---|
| Ex. | 1 | BHET[1] + PTA[2] + SPTA | 32.9:1 | 2.6 | 0.64 | 1.23 |
|  | 2 | BHET + PTA + SPTA[4] | 53.3:1 | 1.6 | 0.73 | 1.09 |
|  | 3 | BHET + PTA + SPTA[5] | 32.9:1 | 2.6 | 0.52 | 1.15 |
| Comp. Ex. | 1 | EG[3] + PTA + SPTA | 0 | 2.6 | 0.48 | 3.05 |
|  | 2 | EG + PTA + SPTA | 0 | 1.6 | 0.55 | 2.74 |
|  | 3 | (EG + PTA)oligomer[6] + SPTA | 0 | 2.6 | 0.52 | 2.91 |
|  | 4 | (EG + PTA)oligomer + SPTA | 0 | 1.6 | 0.57 | 2.83 |
|  | 5 | EG + PTA + SIPA | 0 | 2.6 | 0.48 | 2.5 |
|  | 6 | (EG + PTA)oligomer + SIPA | 0 | 2.6 | 0.49 | 2.3 |

Notes:
[1]BHET: Bis(2-hydroxyethyl) terephthalate;
[2]PTA: Purified terephthalic acid;
[3]EG: Ethylene glycol;
[4]SPTA: 2-sulfoterephthalic acid monosodium salt;
[5]SIPA: 5-sulfoisophthalic acid monosodium salt; and
[6](EG + PTA) oligomer: a mixture of bis(2-hydroxyethyl) terephthalate and oligomer thereof obtained via an esterification reaction of terephthalic acid with ethylene glycol; and

TABLE 2

|  |  | Composition of cationic dyeable polyester | Molar ratio of bis-hydroxy alkyl terephthalate monomer (BHET) to sulfo group-containing aromatic dicarboxylic acid dyeable monomer | Amount of sulfo group-containing aromatic dicarboxylic acid dyeable monomer (wt %) | Content of diethylene glycol* (wt %) | Td (° C.) |
|---|---|---|---|---|---|---|
| Ex. | 1 | BHET + PTA + SPTA | 32.9:1 | 2.6 | 2.5 | 384.2 |
|  | 2 | BHET + PTA + SPTA | 53.3:1 | 1.6 | 2.1 | 380.7 |
|  | 3 | BHET + PTA + SIPA | 32.9:1 | 2.6 | 2.4 | 381.0 |
| Comp. Ex. | 1 | EG + PTA + SPTA | 0 | 2.6 | 5.4 | 346.5 |
|  | 2 | EG + PTA + SPTA | 0 | 1.6 | 4.3 | 353.0 |
|  | 3 | (EG + PTA)oligomer + SPTA | 0 | 2.6 | 4.4 | 354.2 |
|  | 4 | (EG + PTA)oligomer + SPTA | 0 | 1.6 | 4.1 | 352.1 |
|  | 5 | EG + PTA + SIPA | 0 | 2.6 | 4.9 | 351.7 |
|  | 6 | (EG + PTA)oligomer + SIPA | 0 | 2.6 | 4.1 | 354.2 |

Note:
*Content of diethylene glycol: based on a total weight of the cationic dyeable polyester.

As shown in Table 1, the cationic dyeable polyesters of Examples 1 and 2 respectively have average aggregate radii of 1.23 nm and 1.09 nm, and intrinsic viscosities of 0.64 dl/g and 0.73 dl/g. It is demonstrated that in the process for producing a cationic dyeable polyester of each of Examples 1 and 2, the sulfo groups contained in the sulfo group-containing aromatic dicarboxylic acid dyeable monomer has a relatively low aggregation and a relatively low physical cross-linking. Therefore, the esterification reaction product for the polycondensation reaction can be stirred smoothly in the reaction vessel and the cationic dyeable polyester thus produced has a relatively high polymerization degree and a relatively small average aggregate radius.

Comparative Examples 1 to 4 were prepared using similar procedures as those of Examples 1 and 2, in which 2-sulfo-terephthalic acid monosodium salt was also used therein. As shown in Table 1, the cationic dyeable polyester of each of Comparative Examples 1 to 4 has an average aggregate radius in a range of from 2.74 nm to 3.05 nm and an intrinsic viscosity in a range of from 0.48 dl/g to 0.57 dl/g. It is demonstrated that in the process for producing a cationic dyeable polyester of each of Comparative Examples 1 to 4, the sulfo groups contained in the sulfo group-containing aromatic dicarboxylic acid dyeable monomer has a relatively large aggregation and a relatively high physical cross-linking. Therefore, the esterification reaction product for the polycondensation reaction cannot be stirred smoothly in the reaction vessel and the cationic dyeable polyester thus produced has a relatively low polymerization degree and a relatively large average aggregate radius.

Likewise, the cationic dyeable polyester of Example 3 has an average aggregate radius of 1.15 nm and an intrinsic viscosity of 0.52 dl/g. It is demonstrated that in the process for producing a cationic dyeable polyester of Example 3, the sulfo groups contained in the sulfo group-containing aromatic dicarboxylic acid dyeable monomer (i.e., 5-sulfoisophthalic acid monosodium salt) has a relatively low aggregation and a relatively low physical cross-linking. Therefore, the esterification reaction product for the polycondensation reaction can be stirred smoothly in the reaction vessel and the cationic dyeable polyester thus produced has a relatively high polymerization degree and a relatively small average aggregate radius.

Comparative Examples 5 and 6 were prepared using similar procedures as that of Example 3, in which 5-sulfoisophthalic acid monosodium salt was also used therein. As shown in Table 1, the cationic dyeable polyesters of Comparative Examples 5 and 6 respectively have average aggregate radii of 2.5 nm and 2.3 nm, and intrinsic viscosities of 0.48 dl/g and 0.49 dl/g. It is demonstrated that in the process for producing a cationic dyeable polyester of each of Comparative Examples 5 and 6, the sulfo groups contained in the sulfo group-containing aromatic dicarboxylic acid dyeable monomer has a relatively large aggregation and a relatively high physical cross-linking. Therefore, the esterification reaction product for the polycondensation reaction cannot be stirred smoothly in the reaction vessel and the cationic dyeable polyester thus produced has a relatively low polymerization degree and a relatively large average aggregate radius.

The results shown in Table 1 demonstrated that, as compared to Comparative Examples 1 to 6 which represent currently used method for producing the cationic dyeable polyester, a combination of a bis(2-hydroxyethyl) terephthalate monomer and an organic diacid monomer mixture which includes an terephthalic acid monomer and a sulfo group-containing aromatic dicarboxylic acid dyeable monomer was used in Examples 1 to 3 to implement an esterification reaction to form an esterification reaction product, followed by subjecting the esterification reaction product to a polycondensation reaction to obtain the cationic dyeable polyester. The dispersity of the sulfo group-containing aromatic dicarboxylic acid dyeable monomer in the combination can be enhanced such that the sulfo groups contained in the sulfo group-containing aromatic dicarboxylic acid dyeable monomer has a relatively low aggregation and a relatively low physical cross-linking. Therefore, the thus produced cationic dyeable polyester of the disclosure has a relatively high polymerization degree and a relatively small average aggregate radius.

In addition, the color hues (L) of the cationic dyeable polyesters of Examples 1 and 2 after being dyed are respectively 15.76 and 17.29, and the color hues (L) of the cationic dyeable polyesters of Comparative Examples 1 and 2 after being dyed are respectively 15.67 and 18.06. Thus, the cationic dyeable polyester of each of Examples 1 and 2 has dyeability substantially the same as that of the cationic dyeable polyester of each of Comparative Examples 1 and 2. In addition to having a relatively high polymerization degree so as to increase strength of the fibers made from the cationic dyeable polyester, the dyeabilty of the fibers made from the cationic dyeable polyester produced by the process according to the disclosure is not adversely affected.

As shown in Table 2, as compared to Comparative Examples 1 to 6, the cationic dyeable polyester of each of Examples 1 to 3 has a relatively low content of diethylene glycol and a relatively low decomposition temperature (i.e., a superior thermal stability).

In view of the aforesaid, in the process for producing a cationic dyeable polyester according to the disclosure, a combination of a bis-hydroxy alkyl terephthalate monomer of Formula (1) and an organic diacid monomer mixture which includes an aromatic dicarboxylic acid monomer and a sulfo group-containing aromatic dicarboxylic acid dyeable monomer, is used to implement an esterification reaction to form an esterification reaction product, followed by subjecting the esterification reaction product to a polycondensation reaction to obtain the cationic dyeable polyester. The sulfo groups contained in the sulfo group-containing aromatic dicarboxylic acid dyeable monomer can have a relatively low aggregation and a relatively low physical cross-linking such that the thus produced cationic dyeable polyester of the disclosure has a relatively high polymerization degree and a relatively small average aggregate radius. Therefore, the polyester fibers made from the cationic dyeable polyester has a relatively high strength. In addition, the cationic dyeable polyester has a satisfactory dyeability and a superior thermal stability.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A process for producing a cationic dyeable polyester, comprising the steps of:
   (a) subjecting a combination of a bis-hydroxy alkyl terephthalate monomer of Formula (1) and an organic diacid monomer mixture, which includes an aromatic dicarboxylic acid monomer and a sulfo group-containing aromatic dicarboxylic acid dyeable monomer, to an esterification reaction to form an esterification reaction product,

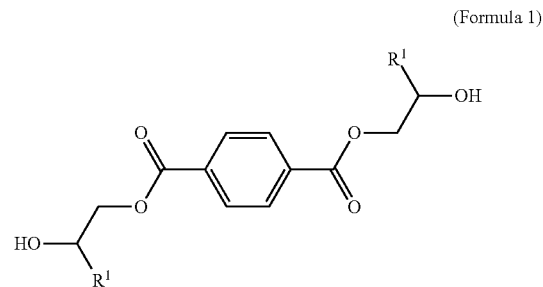

(Formula 1)

wherein each $R^1$ independently represents hydrogen, phenyl, a $C_1$-$C_6$ linear alkyl group, or a $C_3$-$C_6$ branched alkyl group; and
   (b) subjecting the esterification reaction product to a polycondensation reaction.

2. The process according to claim 1, wherein each $R^1$ represents hydrogen.

3. The process according to claim 1, wherein the sulfo group-containing aromatic dicarboxylic acid dyeable monomer is selected from the group consisting of 2-sulfoterephthalic acid monosodium salt, 5-sulfoisophthalic acid monosodium salt, and a combination thereof.

4. The process according to claim 1, wherein a molar ratio of the bis-hydroxy alkyl terephthalate monomer to the aromatic dicarboxylic acid monomer is in a range from 1.5:1 to 150:1.

5. The process according to claim 1, wherein a molar ratio of the bis-hydroxy alkyl terephthalate monomer to the sulfo group-containing aromatic dicarboxylic acid dyeable monomer is in a range from 1.3:1 to 100:1.

6. The process according to claim 1, wherein the aromatic dicarboxylic acid monomer is selected from the group consisting of terephthalic acid, isophthalic acid, phthalic acid, diphenic acid, 2,6-naphthalic acid, 1,5-naphthalic acid, and combinations thereof.

7. The process according to claim 1, wherein in step (a), the esterification reaction is implemented at a normal pressure.

8. The process according to claim 1, wherein in step (b), the polycondensation reaction is implemented in the presence of a transition metal-containing polycondensation catalyst.

9. A cationic dyeable polyester produced by the process according to claim 1.

10. The cationic dyeable polyester according to claim 9, having an average aggregate radius of up to 2.3 nm.

* * * * *